United States Patent [19]

Zindler

[11] 4,282,958
[45] Aug. 11, 1981

[54] DRIVE TRANSMISSION

[76] Inventor: Hugh A. Zindler, Rte. #3, Pleasant Valley La., Watertown, Wis. 53094

[21] Appl. No.: 75,127

[22] Filed: Sep. 13, 1979

[51] Int. Cl.³ .............................................. B60K 41/24
[52] U.S. Cl. ................................ 192/17 R; 192/48.92; 192/52; 192/105 BA
[58] Field of Search ............. 192/17 R, 105 BA, 48.1, 192/48.3, 48.7, 48.92, 52, 14, 145; 56/10, 11.3; 30/381, 382

[56] References Cited

U.S. PATENT DOCUMENTS

| 1,744,637 | 1/1930 | Jacobs et al. | 192/48.7 X |
| 2,947,399 | 8/1960 | Moore et al. | 192/105 BA |
| 3,393,781 | 7/1968 | Atsutami Miura | 192/48.92 X |
| 3,461,994 | 8/1969 | Dallman et al. | 192/105 BA |
| 3,938,633 | 2/1976 | Dietzsch et al. | 192/105 BA X |
| 3,958,680 | 5/1976 | Armbruster et al. | 192/105 BA X |
| 3,991,864 | 11/1976 | Müller | 192/105 BA |
| 4,044,533 | 8/1977 | Wick | 56/11.3 |
| 4,088,210 | 5/1978 | Hoff | 192/105 BA X |

FOREIGN PATENT DOCUMENTS

| 1120646 | 7/1956 | France | 192/48.1 |
| 573451 | 2/1958 | Italy | 192/48.3 |

Primary Examiner—George H. Krizmanich
Attorney, Agent, or Firm—Andrus, Sceales, Starke & Sawall

[57] ABSTRACT

The drive transmission includes rotatable coaxial drive and driven members with a hub member disposed therebetween. A first clutch is provided between the hub member and the drive member to drivingly clutch those members together with a relatively high energizing force. A second clutch is provided between the hub member and the driven member to drivingly clutch those members together with a generally lower energizing force. The transmission provides for clutch slippage due to excessive loading at the second clutch connection and thereby generally precludes slippage at the first clutch connection.

5 Claims, 4 Drawing Figures

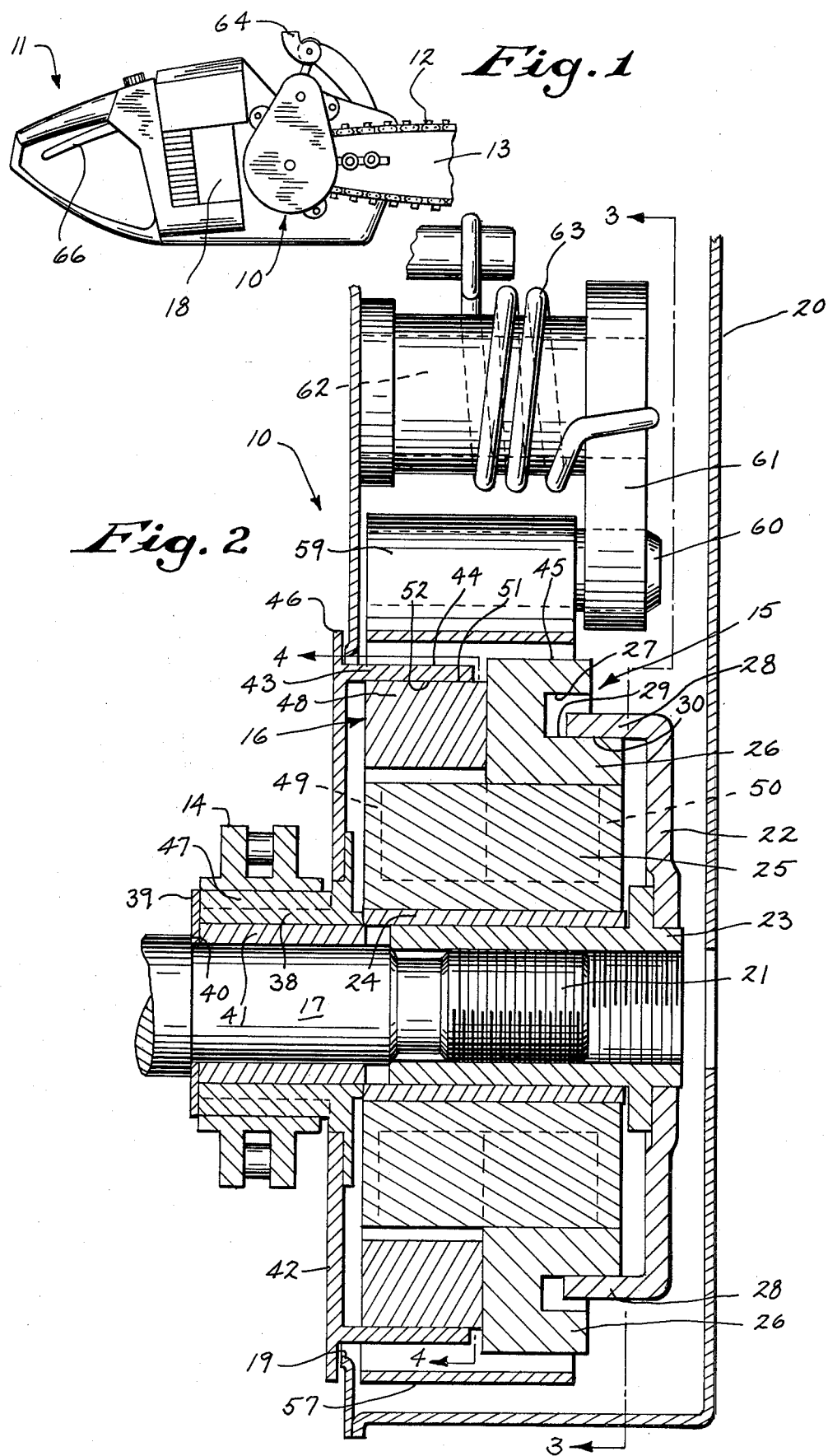

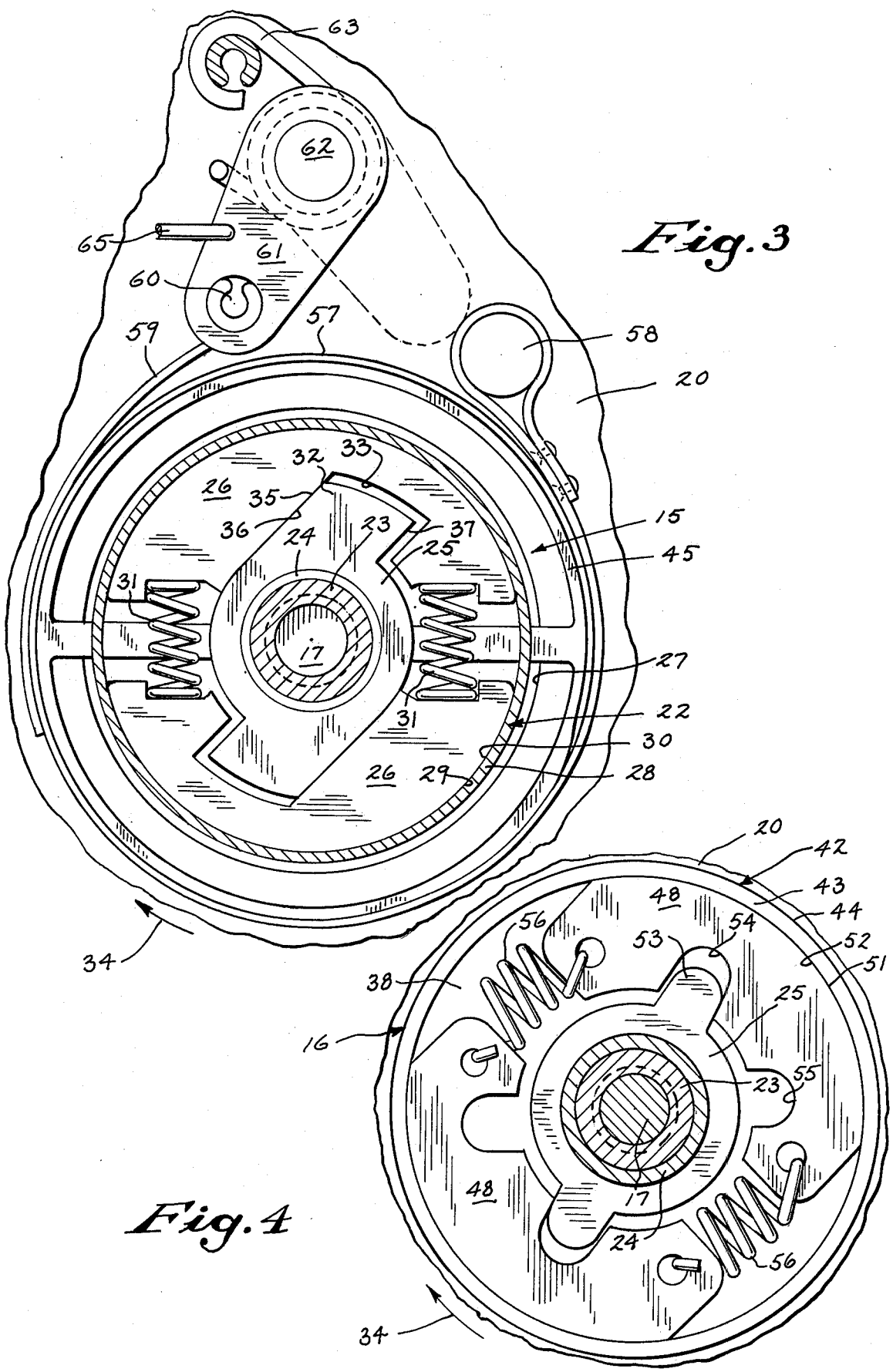

DRIVE TRANSMISSION

BACKGROUND OF THE INVENTION

This invention relates to a drive transmission and more particularly to a clutch and braking arrangement for chain saws.

The applicant's copending application Ser. No. 35,683, filed May 3, 1979, and entitled Clutch-Brake Mechanism describes a clutch and braking arrangement for chain saws. In the structure described in that application, a relatively high energizing force is desirably imposed on the clutch shoes in operation. However, in the event the load on the clutch becomes excessive, as for example when the saw chain becomes stuck in its kerf, the consequent clutch slippage generates a substantial heat and subjects the parts to inordinate wear to adversely affect the life of the clutch parts. It is generally an object of this invention to provide a transmission wherein a relatively high energizing force can be imposed on the drive clutch but its slippage due to excessive load is generally precluded to avoid abusive heat and wear thereon and thus provide for a longer life transmission.

SUMMARY OF THE INVENTION

Generally, the drive transmission of this invention includes rotatable coaxial drive and driven members. A hub member is disposed between the drive and driven members. A first clutch is provided between the hub member and the drive member to drivingly clutch those members together with a relatively high energizing force. A second clutch is provided between the hub member and the driven member to drivingly clutch those members together with a generally lower energizing force. The transmission provides for clutch slippage due to excessive loading at the second clutch connection and thereby generally precludes slippage at the first clutch connection.

DESCRIPTION OF THE DRAWING FIGURES

The drawings furnished herewith illustrate the best mode presently contemplated for carrying out the invention and are described hereinafter.

In the drawings:

FIG. 1 is a partial side elevation of a chain saw embodying the present invention;

FIG. 2 is a sectional view of the transmission for the chain saw of FIG. 1 shown in the drive condition;

FIG. 3 is a sectional view taken generally on the line 3—3 of FIG. 2; and

FIG. 4 is a sectional view taken generally on the line 4—4 of FIG. 2.

DESCRIPTION OF THE ILLUSTRATED EMBODIMENT

Referring to the drawings, the drive transmission 10 of this invention is particularly adapted for use in a chain saw 11 wherein the saw chain 12 is driven around a blade guide 13 by the sprocket 14. According to the invention, the transmission 10 includes a pair of serially actuated clutches 15 and 16 to drive the sprocket 14.

The stepped drive shaft 17 of an engine or other power source 18 extends axially through the opening 19 into the transmission housing 20 and terminates with a threaded end portion 21. The drive shaft 17 carries a drum 22 adjacent the free outer end thereof and which may be integral with the sleeve nut 23 threaded onto the end of the shaft. A bearing sleeve 24 is disposed on the sleeve nut 23 and rotatably mounts the annular driven member or hub 25.

The clutch 15, of the type generally shown and described in applicant's copending application Ser. No. 35,683, filed May 3, 1979, is disposed between the hub or driven member 25 and the drive drum 22 and includes a plurality of segmental clutch shoes 26, two (2) being shown, which are movable radially and circumferentially as described hereinafter. The clutch shoes 26 are each provided with an arcuate, circumferentially extending recess 27 which opens in the direction of and receives the axially and inwardly extending drum flange 28. The outwardly facing surface 29 of the shoe recesses 27 assume a generally circular configuration to match that of and engage with the opposed inwardly facing surface 30 of the drum flange 28 when the shoes 26 are disposed outwardly in their outermost, clutch engaged position as generally shown in FIGS. 2 and 3. Coil compression springs 31 disposed between the respective ends of adjacent shoes 26 normally bias the shoes into their outermost, clutch engaged position.

The driven member or hub 25 is provided with circumferentially and equiangularly spaced drive projections 32 corresponding in number to the shoes 26. Each shoe 26 is provided with an opposed recess 33 to receive the corresponding drive projection 32 of the driven member 25. With respect to the direction of rotation indicated by the direction arrow 34, the trailing side of the respective drive projections 32 are provided with a cam ramp 35 which is generally matched by the corresponding wall 36 of the shoe recess 33. Thus, in addition to the biasing force of coil spring 31, the energizing force for clutch 15 further includes the end load reactive force. The leading side 37 of the driven member projections 32 is disposed on or near a radial line through the hub center. As generally shown in FIG. 3, with the recess wall 36 engaged upon the cam ramp 35, the remaining walls of the recess 33 generally parallel the corresponding sides of the hub projection 32 with operating clearance provided therebetween. With the recesses 33 disposed generally centrally of the shoes 26, the clutch 15 may be characterized as providing for a moderately high torque transmission.

The chain saw transmission 10 includes a second driven member 38 disposed inwardly of the drive shaft 17 relative to the driven member of hub 25 and confined axially between the hub 25 and the washer 39 abutting the shoulder 40 on the stepped shaft. The driven member 38 is freely rotatable on the shaft 17 with the bearing sleeve 41 interposed therebetween. Adjacent to the outer axial extremity of the driven member 38, a drum 42 is carried thereby and has a circumferential flange 43 which extends axially to a location adjacent to the clutch shoes 26. The outwardly facing surface 44 of the drum flange 43 is disposed radially inwardly a short distance relative to the arcuate surfaces 45 on the outer periphery of the shoes 26 when the latter are disposed in their clutch engaged position with the drum 22 as generally shown in FIG. 2. The drum 42 further includes a radially extending peripheral flange 46 which extends outwardly beyond the adjacent edge of opening 19 so that the rotating drum 42 can serve as a slinger plate to generally preclude the entry of oil, sawdust and other foreign matter into the transmission housing 20. The sprocket 14 is disposed on the driven member 38 axially inward from the drum 42 and is rotationally secured thereon by the spline connection 47.

The second driven member 38 along with the sprocket 14 is driven from the first driven member or hub 25 though the clutch 16. Clutch 16 is a centrifugal type clutch and includes a plurality of segmental clutch shoes 48, two (2) being shown, which are movable radially between the driven member or hub 25 and the driven drum 42. As generally shown in FIG. 2, the shoes 48 of clutch 16 and the shoes 26 of clutch 15 generally abut each other at the approximate center of the driven member or hub 25 as measured axially, and the opposed axial extremities of the shoes 48 and 26, respectively, are axially confined for sliding movement radially by the opposed radial flanges 49 and 50 formed integrally with or secured to the corresponding ends of the driven member or hub 25.

The outer peripheral surfaces 51 of the shoes 48 have a circular configuration and match the inner cylindrical surface 52 of the drum flange 43 in the engaged condition as shown in FIG. 4. The shoes 48 are guided for movement radially into and out of the clutch engaged position by circumferentially and equiangularly spaced radial lobe projections 53 on the driven member or hub 25 corresponding to the number of segmental shoes for the clutch 16. The lobe projections 53 are received with sliding clearance by the corresponding opposed recesses 54 provided in the clutch shoes 48 as generally shown in FIG. 4. With the lobe projections 53 disposed within the shoe recesses 54 generally adjacent to the trailing end of the shoes 48 as shown in FIG. 4, the centrifugal clutch 16 may be characterized as providing for a relatively high torque transmission. Each shoe 48 may be provided with one or more additional recesses 55, generally similar to the engaged or active recesses 54, and spaced toward the leading end of the shoes. With recessess 55 closer to the leading end of the shoes 48 engaged upon the lobe projections 53, the clutch 16 would be capable of a lesser torque transmission and thus perhaps more suited to a power source 18 of lesser horsepower. Thus, the provision of the additional recesses 55 in the shoes 48 makes the transmission 10 more versatile in that the same unit can be used with a wider range of horsepower. Coil tension springs 56 disposed between the respective ends of adjacent shoes 48 normally bias the shoes toward their innermost, clutch disengaged position.

Mechanism is further provided for braking the driven members 25 and 38 of transmission 10 including the brake band 57. Brake band 57 is the common braking means for both driven members 25 and 38 and as depicted in FIG. 2 has a width providing for engagement with major portions of the outer periphery of the clutch shoes 26 and of the drum flange 43, respectively.

Referring particularly to FIG. 3 of the drawings, the brake band 57 is secured at one end to the anchor post 58 fixed to the wall of transmission housing 20 and extends more than 360° around the outer periphery of the clutch shoes 26 and the drum flange 43 to provide some overlap upon itself. On the side of the mechanism opposite from the fixed anchor post 58, a brake band extension member 59 is secured to an intermediate portion of the band 57 and extends for connection to the movable anchor post 60 carried by the braking lever 61. The braking lever 61 is mounted on the housing post 62 and is pivotal thereon between the position depicted in FIG. 3 wherein the brake band 57 is expanded and spaced radially outwardly from the outer periphery of the clutch shoes 26 and the drum flange 43 such that both clutches 15 and 16 can be engaged to drive the saw chain 12, and the brake-on position is contracted and as shown by dashed lines in FIG. 3 wherein the band engages with the outer peripheral braking surfaces 45 of the shoes 26 to move those shoes out of clutching engagement and with the braking surface 44 of the drum 42 to effect a disengagement of both clutches 15 and 16 and braking of both driven members 25 and 38 without interruption of the engine or other power source 18. With the shoes 26 rotating in the direction indicated by the arrow 34, the contracting brake band 57 is initially brought into contact with the shoes 26 and then caused to frictionally wrap or tighten itself thereon so as to be self-energizing and thus effect a quick clutch release and quick stopping of the driven members. The arcuate braking surfaces 45 of the shoes 26 are designed to present a circular configuration in the full brake-on position to generally match the configuration of the braking surface 44 on the drum 42, and in the full brake-on position the braking surfaces 44 and 45 are generally axially aligned.

The torsion spring 63 seated on the housing post 62 bears against the braking lever 61 to normally bias the lever to the brake-on position shown by dashed lines in FIG. 3 and is able to overcome the effect of the clutch energizing forces acting on the clutch shoes 26. A manual force adequate to overcome the biasing force of the torsion spring 63 must be imposed on the lever 64, connected in a manner not shown, to the linkage member 65, to move and thereafter hold the brake lever 61 in a brake-off condition. As a possible alternative, the linkage member 65 may be connected to the throttle lever or trigger 66 such that the brake lever 61 is moved to the brake-off condition as the engine throttle or power is increased.

In service, the driving drum 22 rotates even while the engine or other power source 18 operates at idle speed. To energize the clutch 15 with the engine or other power source 18 running, the brake lever 61 is movably actuated through the linkage member 65 from its normal brake-on position as by the lever 64. As the brake lever 61 moves toward the full brake-off position, the brake band 57 is expanded allowing the compression springs 31 to bias the clutch shoes 26 outwardly to make initial contact with the rotating drive drum 22. Upon making initial contact, the torque of the drum 22 acting on the shoes 26 drives the shoes against the angular cam ramps 35 of the corresponding hub projections 32. In view of the inertia or reactive force imposed by the end load upon the driven member or hub 25, the shoes 26 are forced outwardly on the cam ramps 35 to make full length engagement with the driving drum 22 and to wedge themselves solidly between the cam ramps and the drum to effect a generally smooth and quick pickup of the driven member or hub 25. Meanwhile, the centrifugal clutch 16 remains disengaged because of the biasing force of the tension springs 56.

The centrifugal clutch 16 is engaged to energize the second driven member 38 and drive the saw chain 12 when the common driven member or hub 25 reaches a predetermined speed such that the centrifugal force acting on the clutch shoes 48 overcomes the biasing force of the tension springs 56. Thus the clutches 15 and 16 are serially energized.

At the conclusion of a cutting operation by the saw chain 12, or at any time it is desired to stop the saw chain, the brake lever 61 is simply released to allow the torsion spring 63 to effect return of the lever to the brake-on position and thereby contract the brake band 57 to effect braking. As the brake band 57 contracts, it engages first the braking surfaces 45 of the shoes 26 to first effect a disengagement of the driving clutch 15. The initial disengagement and braking of the driving clutch 15 of course also stops rotation of the common driven member or hub 25 to also effect a disengagement of the centrifugal clutch 16. Thereafter the brake band 57 engages upon the braking surface 44 of the drum 42 to stop any remaining coasting effect left in the second driven member 38 and the saw chain 12.

It should be noted that at least up through the predetermined speed for engaging the centrifugal clutch 16, there should be no clutch slippage in the tranmission 10 because the common driven member or hub 25 along with the disengaged shoes 48 then represent the only load imposed on the transmission and is entirely free to rotate. After both clutches 15 and 16 are engaged to drive the saw chain 12, clutch slippage will occur, if for example, the saw chain becomes stuck in its kerf. Such slippage will ordinarily generate substantial heat and give rise to wear, particularly at the slipping clutch surfaces. In the transmission 10 that slippage will more likely occur in the centrifugal clutch 16 than in the drive clutch 15 to good advantage because of the lesser energizing force acting on the clutch shoes 48. The drive clutch 15 with its substantially higher energizing force is, therefore, generally protected from abusive heat and wear.

Various modes of carrying out the invention are contemplated as being within the scope of the following claims particularly pointing out and distinctly claiming the subject matter which is regarded as the invention.

I claim:

1. In a drive transmission, rotatable coaxial drive and driven members, a drum carried on each said drive and driven member with the circumferential drum flanges disposed in facing relation, a hub member intermediate the drive and driven drums, a first clutch comprising segmental clutch shoes disposed between the hub member and the drive drum, means for effecting movement of the first clutch shoes into engagement with the drive drum to drivingly clutch the hub member to the drive drum with a relatively high energizing force, said first segmental clutch shoes projecting radially outward beyond the driven drum in their clutch engaged position, a second clutch comprising segmental clutch shoes disposed between the hub member and the driven drum, spring means biasing the second segmental clutch shoes toward disengagement from the driven drum with the biasing force of said spring means being overcome by centrifugal force above a predetermined speed to drivingly clutch the hub member to the driven member with a generally lower energizing force than experienced at said first clutch to provide for clutch slippage due to excessive loading at the driven member clutch connection and thereby generally preclude slippage at the drive member clutch connection, a braking surface on the outer periphery of the first segmental clutch shoes, a brake band extending peripherally around the first segmental clutch shoes and the drum flange on said driven member, said brake band being movable between an expanded condition wherein the brake band is spaced radially outward relative to the first segmental clutch shoes and the drum flange of said driven member and a contracted condition wherein the brake band serially engages first with the braking surface on said first segmental clutch shoes to displace the shoes inwardly out of clutching engagement with the drive drum and then engages with the drum flange of the driven member to stop rotation of the driven member without interrupting the rotation of the drive member, and means to move the brake band.

2. The structure as set forth in claim 1, wherein the drive transmission is disposed in a chain saw for driving the saw chain.

3. The structure as set forth in claim 1 wherein the means to move the brake band comprises a braking lever pivotally mounted for movement between a brake-on position and a brake-off position, and means to normally bias said braking lever into the brake-on position.

4. The structure as set forth in claim 1 wherein the hub member is provided with a plurality of circumferentially and equiangularly spaced radial projections corresponding in number to the number of second segmental clutch shoes, said projections being selectively engaged by one of a plurality of opposed spaced recesses provided in each second segmental clutch shoe to adapt said shoes for a range of horsepower transmission.

5. The structure as set forth in claim 1 wherein the hub member is provided with a plurality of circumferentially and equiangularly spaced outward projections corresponding in number to the number of first segmental clutch shoes, said projections extending into a corresponding recess provided in each said first segmental clutch shoe, said projections further having a cam ramp provided on the trailing side thereof engagable by the corresponding first segmental clutch shoe in the clutch engaged condition.

* * * * *